(12) United States Patent
Wade, Jr.

(10) Patent No.: US 6,189,336 B1
(45) Date of Patent: Feb. 20, 2001

(54) APPARATUS FOR FACILITATING THE FORMATION CAPTURE AND COMPRESSION OF SOLID CARBON DIOXIDE PARTICLES

(75) Inventor: Elton J. Wade, Jr., Hanover, VA (US)

(73) Assignee: Innovative $Co_2$ Equipment, Inc., Charlotte, NC (US)

(*) Notice: Under 35 U.S.C. 154(b), the term of this patent shall be extended for 0 days.

(21) Appl. No.: 09/335,455

(22) Filed: Jun. 17, 1999

Related U.S. Application Data

(63) Continuation-in-part of application No. 09/229,644, filed on Jan. 13, 1999.

(51) Int. Cl.[7] ............................................. F25J 1/00
(52) U.S. Cl. ................................. 62/604; 62/605
(58) Field of Search ................................ 62/604, 605

(56) References Cited

U.S. PATENT DOCUMENTS

| | | | |
|---|---|---|---|
| 3,576,112 | * 4/1971 | Frost et al. | 62/605 |
| 5,419,138 | * 5/1995 | Anderson et al. | 62/605 |
| 5,528,907 | * 6/1996 | Pint et al. | 62/604 |
| 5,548,960 | * 8/1996 | Anderson et al. | 62/605 |
| 5,845,516 | * 12/1998 | Allen et al. | 62/605 |

* cited by examiner

*Primary Examiner*—William Doerrler
(74) *Attorney, Agent, or Firm*—McGuireWoods LLP

(57) ABSTRACT

A method and apparatus for facilitating the conversion of liquid carbon dioxide to solid carbon dioxide particles for compression into pellets or blocks using a liquid carbon dioxide conversion apparatus having a compression assembly and at least one snow accumulator assembly attached thereto includes introducing liquid carbon dioxide into the interior of a filter where it changes phase to a mixture of gas and solid particles. The gas is emitted through the filter leaving the solid particles within the filter interior. The carbon dioxide particles are then transferred from the filter to a compression chamber where they are compressed by a compression piston.

26 Claims, 4 Drawing Sheets

APPARATUS FOR FACILITATING THE FORMATION CAPTURE AND COMPRESSION OF SOLID CARBON DIOXIDE PARTICLES

CROSS REFERENCE TO RELATED APPLICATION

This application is a continuation-in-part of application Ser. No. 09/229,644 filed Jan. 13, 1999.

BACKGROUND OF THE INVENTION

The present invention relates broadly to apparatus for manufacturing solid carbon dioxide particles, known to those skilled in the art as carbon dioxide snow. More specifically, the present invention relates to a method and apparatus for facilitating the formation, capture and compression of snow-like carbon dioxide particles into structures that are ready for packaging, use or future processing.

Solid carbon dioxide, or dry ice, has long been used for a variety of desirable cooling purposes. Previous methods of converting liquid carbon dioxide to a solid were slow and required the use of expensive manufacturing equipment.

In one manufacturing method described in Rupp, U.S. Pat. No. 2,570,074, purified carbon dioxide is first passed through a condensing zone to convert the vaporous material to its liquid state. Next, a vent zone receives the liquid carbon dioxide and removes any uncondensed gases. The remaining liquid carbon dioxide is then passed through a reducing valve and flashed into a zone maintained at a uniform temperature and pressure. Crystals that form and settle within this zone are withdrawn from the chamber. A fine spray of water introduced into the zone flows down the sides of the chamber with carbon dioxide solidifying on the surface of the water as carbon dioxide ice. This carbon dioxide ice is then collected and passed to a hopper outside the chamber. Any vaporous carbon dioxide in the chamber may be recycled back into the system after being compressed.

In another dry ice manufacturing process, described in Rupp, U.S. Pat. No. 2,608,838, results were obtained through cooling occurring in the solidification zone by means of a circulating gas. This gas preferably boils at a lower temperature than does carbon dioxide and cooling takes place by directly cooling the carbon dioxide gas. The gas may be a vaporizing refrigerant such as methane, nitrogen, ethane or ethylene.

Love, U.S. Pat. No. 4,415,346 describes a carbon dioxide snow horn for dry ice production that utilizes a downwardly directed skirt opened at its lower, larger diameter end. The upper, smaller diameter head allows introduced liquid carbon dioxide to expand inside the skirt. A gas venting system around the skirt allows exhaust gas to be withdrawn from the chamber.

Manufacturing methods currently in use in the dry ice industry can be complex, inefficient and slow. Production rates of current machines are limited because their operating cycles include separating the solid carbon dioxide particles from a closed volume of carbon dioxide gas (typically by settling) followed by venting of the gas and, finally, compression into solid pellets or blocks. The cycle time is primarily driven by the time it takes for the particles to settle and is typically on the order of 40–50 seconds. As a result, a high capacity machine can typically provide no more than 1500–2500 pounds of dry ice per hour.

SUMMARY OF THE INVENTION

It is therefore an object of the present invention to provide an improved liquid carbon dioxide conversion apparatus for converting liquid carbon dioxide to solid carbon dioxide particles and compressing them to form solid carbon dioxide structures such as pellets or blocks.

It is also an object of the present invention to provide a liquid carbon dioxide conversion apparatus that permits rapid, efficient collection and compression of particulate carbon dioxide converted from liquid carbon dioxide while capturing carbon dioxide converted to a gas during the process. The captured gaseous carbon dioxide is then available for reconversion to a liquid.

Another object of the present invention is to provide an improved method of manufacturing solid carbon dioxide articles formed from compressed particulate carbon dioxide. The method includes using a piston in a compression chamber to which is attached at least one accumulation chamber wherein the piston seals the accumulation chamber while particulate carbon dioxide is being formed and accumulated therein. When desired, the piston can be moved to allow the particulate carbon dioxide to be transferred to the compression chamber where it can be compressed into a block or extruded to form pellets.

It is a further object of the present invention to provide an apparatus for manufacturing solid carbon dioxide articles formed from compressed particulate carbon dioxide using a piston in a compression chamber to which is attached a plurality of accumulation chambers wherein the piston seals each accumulation chamber while particulate carbon dioxide is being formed and accumulated therein. The piston can then be moved to allow the particulate carbon dioxide to be transferred to the compression chamber where it can be compressed into a block or extruded to form pellets.

Another object of the present invention is to provide an improved method of converting liquid carbon dioxide to solid carbon dioxide using an apparatus that includes an accumulator housing and an inner filter defining an accumulation chamber in fluid communication with a compression chamber through a transfer portal. The method includes injecting liquid carbon dioxide into the accumulation chamber for phase transition to a mixture of gaseous and solid particulate carbon dioxide while a piston disposed within the compression chamber seals the transfer portal. The filter permits passage of the gas for collection external to the apparatus and traps the solid particles for accumulation.

To those ends, a liquid carbon dioxide conversion apparatus according to the present invention, includes a compression housing defining a compression chamber and at least one transfer portal in fluid communication with the compression chamber. The conversion apparatus further includes an assembly for converting liquid carbon dioxide to particulate solid carbon dioxide, including at least one snow accumulation chamber in fluid communication with the at least one transfer portal. Also included are means for transferring particulate solid carbon dioxide from each snow accumulation chamber to the compression chamber through a transfer portal. The conversion apparatus also includes a compression piston movably mounted in the compression chamber. The compression piston is configured for compressing particulate solid carbon dioxide accumulated within the compression chamber. The compression piston may be positioned within the compression chamber to seal the at least one transfer portal.

The compression chamber of a liquid carbon dioxide conversion apparatus according to the present invention preferably has first and second open ends. The first open end is preferably configured for receiving the compression piston into the compression chamber.

In one embodiment of the liquid carbon dioxide conversion apparatus according to the present invention, an extruder plate is removably attached to the compression housing in covering relation to the second end of the compression chamber. The extruder plate has at least one extrusion hole extending therethrough in communication with the compression chamber. Particulate solid carbon dioxide pressed against the extruder plate by the compression piston will be forced through the extrusion holes to form extruded solid carbon dioxide pellets. The compression chamber of this embodiment is preferably formed with a generally cylindrical configuration.

In another embodiment of the liquid carbon dioxide conversion apparatus according to the present invention, a movable compression wall is attached to the compression housing and is selectively movable in and out of covering relation with the second end of the compression chamber. Particulate solid carbon dioxide may be compressed by the compression piston against the compression wall when the compression wall is in covering relation with the second end of the compression chamber, thereby forming a block of solid carbon dioxide.

The assembly for transferring particulate solid carbon dioxide preferably includes a transfer piston movably mounted within each snow accumulation chamber. Particulate solid carbon dioxide within the snow accumulation chamber may be pushed by the transfer piston from the snow accumulation chamber into the compression chamber. The assembly for transferring preferably further includes an assembly for selectively actuating movement of the transfer piston within the snow accumulation chamber. The actuating assembly preferably includes a transfer piston rod connected to a pressurized fluid actuation system. The pressurized fluid actuation system allows selective application of pressurized fluid to the transfer piston rod to cause transfer piston movement.

The assembly for converting liquid carbon dioxide to particulate solid carbon dioxide preferably includes at least one accumulator housing defining an injection chamber, a chamber injector port in fluid communication with the injection chamber and an exit portal in fluid communication with the at least one transfer portal. The accumulator housing preferably has a vapor exhaust port formed therein that is in fluid communication with the injection chamber. The assembly for converting further preferably includes a filter mounted to the accumulator housing within the injection chamber. This filter includes a filter body defining the snow accumulation chamber, a filter injector port and an exit opening. The filter body is mounted to the accumulator housing with the exit opening adjacent the exit portal. When the at least one transfer portal is sealed by the compression piston, at least a portion of liquid carbon dioxide injected through the chamber injector port and the filter injector port into the snow accumulation chamber will undergo phase transition to gaseous carbon dioxide for emission through the filter body and exhaustion through the exhaust port. At least a second portion of the liquid carbon dioxide will undergo a phase transition to particulate solid carbon dioxide for accumulation within the snow accumulation chamber.

The assembly for converting liquid carbon dioxide further preferably includes an assembly for injecting liquid carbon dioxide through the chamber injector port and the filter injector port into the snow accumulation chamber when the at least one transfer portal is sealed by the compression piston. The assembly for injecting liquid carbon dioxide provides for phase transition of at least a portion of the liquid carbon dioxide to gaseous carbon dioxide for emission through the filter body and the exhaust port, and for phase transition of at least a portion of the liquid carbon dioxide to particulate solid carbon dioxide for accumulation within the snow accumulation chamber.

The liquid carbon dioxide conversion apparatus according to the present invention preferably includes an assembly for selectively actuating movement of the compression piston within the compression chamber. This actuating assembly preferably includes a compression piston rod connected to a pressurized fluid actuation system for selective application of pressurized fluid to the compression piston rod to cause compression piston movement.

A sealing sleeve is preferably disposed over at least a portion of the circumference of the compression piston. The sealing sleeve is in slidable contact with the inner surface of the compression chamber.

A method for converting liquid carbon dioxide to compressed solid carbon dioxide pellets according to the present invention includes providing a compression housing defining a compression chamber and a transfer portal. The compression chamber has a compression piston movably mounted therein. The compression chamber has opposing first and second open ends, the first open end being open for receiving the compression piston. The method further includes providing an extruder plate removably attached to the compression housing in covering relation with the second end of the compression chamber. The extruder plate preferably has at least one extrusion hole extending therethrough in communication with the compression chamber. The method further includes providing an assembly for converting liquid carbon dioxide to particulate solid carbon dioxide. This assembly includes a snow accumulation chamber in fluid communication with the transfer portal.

The method further includes the steps of positioning the compression piston to seal the transfer portal and converting liquid carbon dioxide to particulate solid carbon dioxide for accumulation within the snow accumulation chamber using the assembly for converting liquid carbon dioxide. The method further includes moving the piston toward the first end of the compression chamber, thereby opening the transfer portal. Further included are the steps of transferring the particulate solid carbon dioxide from the snow accumulation chamber to the compression chamber and moving the compression piston toward the second end of the compression chamber, thereby forcing the particulate solid carbon dioxide against the extruder plate and through the at least one extrusion hole.

The step of providing an assembly for converting liquid carbon dioxide preferably includes providing an accumulator housing defining an injection chamber and a filter mounted to the accumulator housing within the injection chamber. The filter includes a filter body defining the accumulation chamber.

A method for converting liquid carbon dioxide to a compressed solid carbon dioxide block according to the present invention includes providing a compression housing defining a compression chamber and a transfer portal. The compression chamber has a compression piston movably mounted therein. The compression chamber has opposing first and second open ends, the first open end being configured for receiving the compression piston. The method further includes providing a moveable compression wall attached to the compression housing and selectively moveable in and out of a covering relation with the second open end of the compression chamber. Also included is the step of providing an assembly for converting liquid carbon dioxide to particulate solid carbon dioxide. The assembly for converting includes a snow accumulation chamber in fluid communication with the transfer portal. The method further includes positioning the compression piston to seal the transfer portal and converting liquid carbon dioxide to particulate solid carbon dioxide for accumulation within the snow accumulation chamber using the assembly for converting liquid carbon dioxide. The method further includes the steps of moving the piston toward the first end of the compression chamber, thereby opening the transfer portal, and transferring the particulate solid carbon dioxide from the snow accumulation chamber to the compression chamber. The compression piston is moved toward the second end of the compression chamber, thereby pressing the particulate solid carbon dioxide against the compression wall, thereby compressing the particulate solid carbon dioxide into a block of solid carbon dioxide. The method further includes moving the compression wall out of covering relation with the second open end of the compression chamber and moving the compression piston toward the second open end of the compression chamber, thereby pushing the block of solid carbon dioxide out of the compression chamber.

The step of providing an assembly for converting liquid carbon dioxide to solid particulate carbon dioxide of the method for converting liquid carbon dioxide to a compressed solid carbon dioxide block preferably includes providing an accumulator housing defining an injection chamber and a filter mounted to said accumulator housing within the injection chamber. The filter includes a filter body defining the accumulation chamber.

By the above, the present invention provides an improved apparatus for converting liquid carbon dioxide to solid carbon dioxide pellets and blocks. This apparatus uses the cooperative action of a solid carbon dioxide compression assembly and an efficient carbon dioxide snow production assembly. The cooperative action provides significant efficiency and productivity advantages over current production methods that typically require complete separation of the solid particulate carbon dioxide production process and the process of forming solid structures from the solid particulate carbon dioxide.

DESCRIPTION OF THE PREFERRED EMBODIMENT

Figure 1:
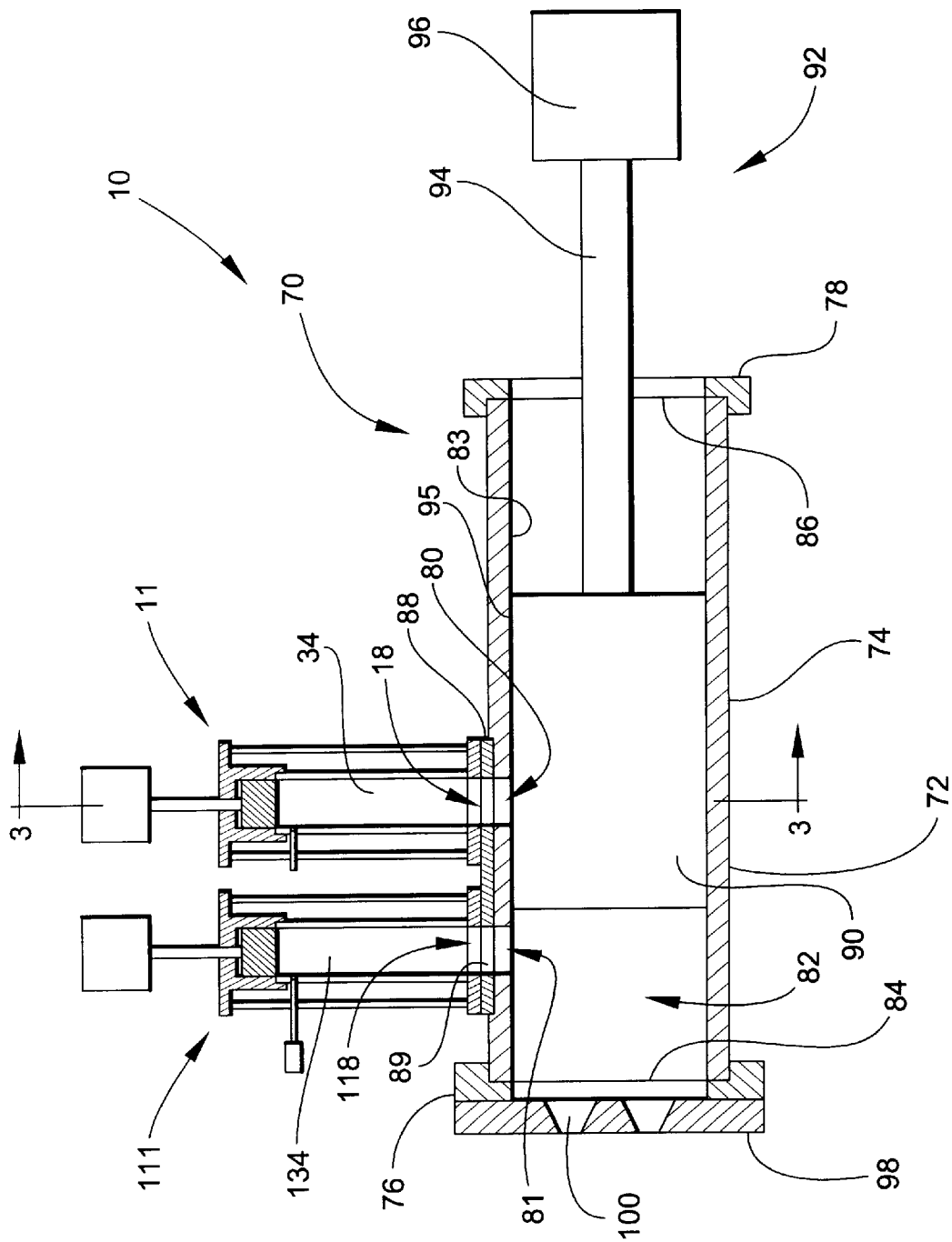
FIG. 1 is a side cross-sectional, diagrammatic view of a liquid carbon dioxide conversion apparatus according to the preferred embodiment of the present invention.

Turning now to the drawings, and more particularly, to FIG. 1, a liquid carbon dioxide conversion apparatus according to the present invention is illustrated generally at 10 and includes two accumulator assemblies 11, 111 and a compression assembly 70. The accumulator assemblies 11, 111 are mounted to the compression assembly 70 and are operatively connected thereto. The accumulator assemblies 11, 111 are used to convert liquid carbon dioxide to particulate solid carbon dioxide which is then transferred to the compression assembly 70 for compression and extrusion into pellets. It will be appreciated by those skilled in the art that a particular number of accumulator assemblies is not required. The number may vary with the production capability of the machine. Depending upon the rate of solid carbon dioxide production desired, a single accumulator assembly or three or more accumulator assemblies may be used.

Figure 2:
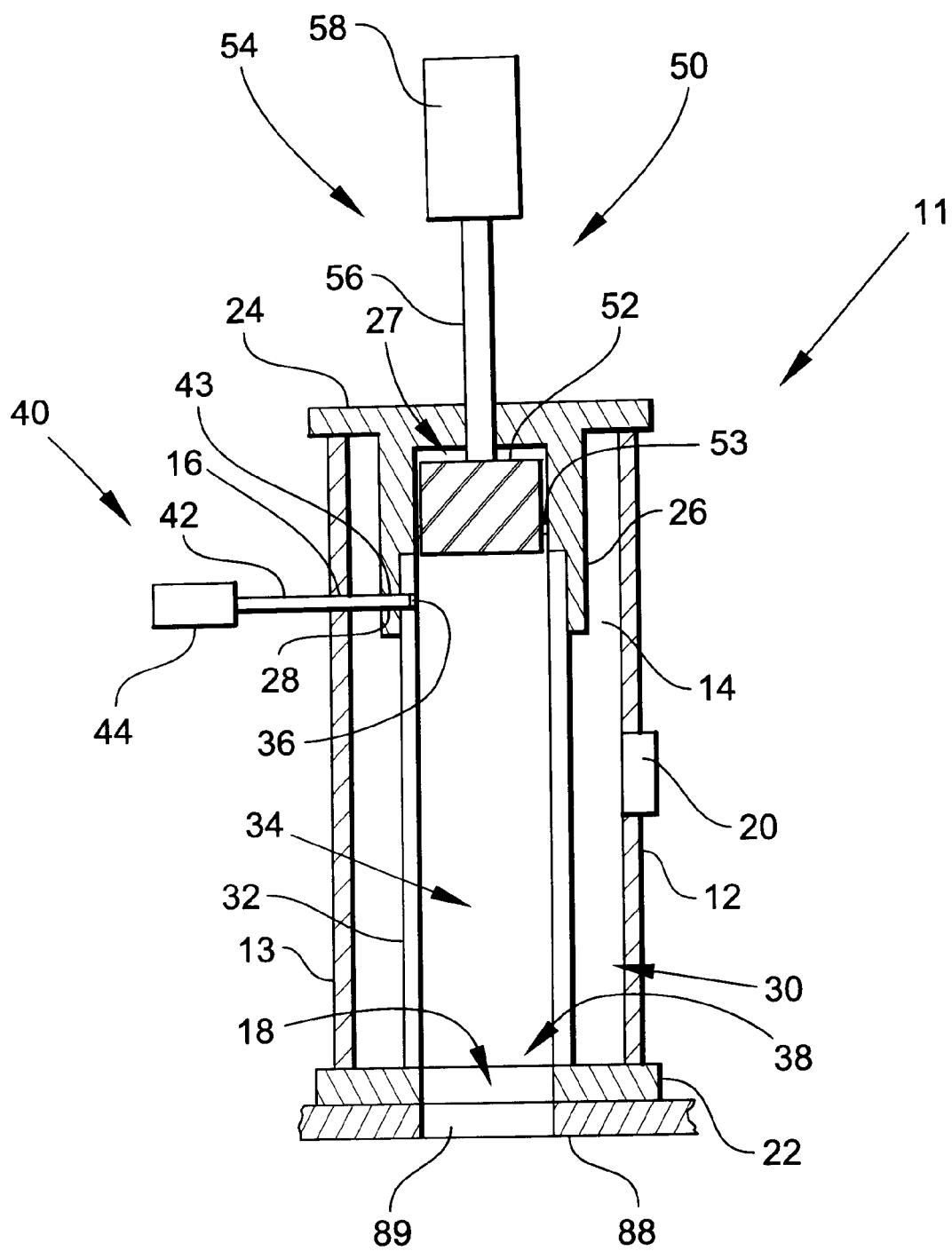
FIG. 2 is the side cross-sectional, diagrammatic view of an accumulator assembly of a liquid carbon dioxide conversion apparatus illustrated in FIG. 1.

As illustrated in FIG. 2, an accumulator assembly 11 includes an accumulator housing 12 that defines an injection chamber 14, an injector port 16, a vapor exhaust port 20 and an exit portal 18. The accumulator housing 12 includes an accumulator housing cylinder 13 attached to a front mounting plate 22 and a rear mounting plate 24. It should be understood that the accumulator housing 12 and the injection chamber 14 may be other shapes and the accumulator housing 12 may also be formed as a single integral unit without departing from the spirit and scope of the present invention. The front mounting plate 24 is attached to a spacer 88 that is in turn attached to the compression housing 72 of the compression assembly 70 as will be described in greater detail hereafter.

The exit portal 18 is a circular hole defined by the front mounting plate 22 and is in communication with the injection chamber 14. The centerline of exit portal 18 is substantially aligned with the central axis of the cylindrical injection chamber 14. The spacer 88 includes a spacer port 89 having substantially the same diameter as and aligned with the exit portal 18. The injector port 16 is an access port bored through the accumulator housing cylinder 13. As will be described in greater detail hereafter, the injector port 16 is positioned so that an injection probe 42 may be inserted therethrough and through filter injector port 36 near one end of a filter 30 that is positioned concentrically within the injection chamber 14. The vapor exhaust port 20 is a hole through the wall of the accumulator housing cylinder 13 that is in fluid communication with the injection chamber 14 and the region external to the accumulator assembly. The vapor exhaust port 20 may be in fluid communication with the ambient surroundings but is preferably connected to a system for storing carbon dioxide gas or for converting carbon dioxide gas to liquid.

The filter 30 includes a filter body 32 that is configured to permit passage of carbon dioxide gas therethrough while inhibiting passage of particulate carbon dioxide. The filter body 32 forms an essentially self-supporting filter medium and is formed from a porous material such as sintered stainless steel. Stainless steel filters of this type are commercially available from GKN Sinter Metals and are marketed under the product name SIKA-R. Any of these filters or their equivalent is suitable for use in the present invention. Those skilled in the art will appreciate that other materials and other types of commercially available filter elements may be used as well. While a variety of filtration grades are available, a 100.0 micron filtration grade is preferred. More porous filters may be used, but the efficiency of the apparatus may be reduced due to passage of carbon dioxide particles through the filter. A perforated solid material having an equivalent filtration grade is also theoretically usable.

With reference to FIG. 2, the filter body 32 is preferably formed as a cylindrical tube as illustrated in FIG. 2. The inner surface 33 of the filter body 32 of the conversion apparatus 10 defines an accumulation chamber 34. The filter body 32 further defines a filter injection port 36 and an exit opening 38. The filter body 32 is attached to the accumulator housing 12 so that the only fluid communication path between the accumulation chamber 34 and the portion of the injection chamber 14 exterior to the filter body 32 is through the porous filter body 32.

The filter body 32 is supported at one end by a generally cylindrical support sleeve 26 formed on the rear mounting plate 12. The support sleeve 26 has an inside diameter that is slightly larger than the outside diameter of the filter body 32, such that a portion of the filter body 32 may be telescopically mounted therein. The support sleeve 26 includes a support sleeve port 28 that is aligned with the filter injector port 36. The end of the filter body 32 opposite the support sleeve 26 is fitted against the front mounting plate 22 of the accumulator housing 12 with the exit opening 38 adjacent and substantially in registry with the exit portal 18. Those skilled in the art will recognize that there are other means of supporting the filter body 32 and sealing the accumulation chamber 34 that the artisan may use without deviating from the present invention. The filter body 32 also includes a piston entrance opening 37 at the end of the filter body 32 opposite the exit opening 38. The piston entrance opening 37 facilitates the use of a piston for carbon dioxide particle removal as will be explained in more detail hereafter.

The inner surface 33 of the filter body 32 is preferably substantially smooth to facilitate the substantially complete removal of carbon dioxide particles from the accumulation chamber 34 at the end of a production cycle. In particular, a substantially smooth surface facilitates the operation of a piston for carbon dioxide particle removal as will be explained in more detail hereafter. Substantially complete removal aids in maintaining production efficiency and, more importantly, helps to prevent clogging of the filter.

The accumulator assembly 11 includes an assembly 40 for injecting liquid carbon dioxide into the accumulation chamber 34 through the chamber injector port 16 and the filter injector port 36. The assembly 40 includes an injection probe 42 that is in fluid communication with a liquid carbon dioxide source illustrated at 44. The injection probe 42 has a tip 43 that is inserted through the chamber injector port 16 and the support sleeve port 28 and into the filter injector port 36. The tip 43 is positioned so that it does not project beyond the inner surface 33 of the filter body 32. This assures that the injection probe 42 will not interfere with the removal of carbon dioxide particles from the accumulation chamber 34, as will be shown in greater detail hereafter. The filter injector port 36 and the probe tip 43 may be matably threaded to assure that the injection probe 42 is held securely in place and to assure that the filter injector port 36 does not provide a path for unwanted gas flow from the accumulation chamber 34 to the portion of the injection chamber 14 exterior to the filter body 32. Alternatively, or in addition, the support sleeve port 28 and the probe tip 43 may be matably threaded. The support sleeve 26 and support sleeve port 28 are configured to provide support to the injection probe 42 and the area of the filter body 32 surrounding the filter injector port 36.

The accumulator assembly 11 further includes a particle removal assembly 50 for removing solid carbon dioxide particles from the accumulation chamber 34. The particle removal assembly 50 includes a transfer piston 52 that is configured for receipt by the cylindrical filter body 32. The support sleeve 26 defines a generally cylindrical piston chamber 27 with an opening 29 disposed adjacent the piston entrance opening 37 of the filter body 32. The cylindrical piston chamber 27 is approximately the same diameter as the accumulation chamber 34 and is aligned with the accumulation chamber 34 to provide a contiguous path of travel for the transfer piston 52. The transfer piston 52 is slidably disposed within the piston chamber 27 and may be reciprocally moved into and out of the accumulation chamber 34. Accordingly, the transfer piston 52 has a range of reciprocal movement that allows it to be entirely withdrawn from the accumulation chamber 34 while carbon dioxide particles are accumulating in the accumulation chamber 34. This maximizes the filter volume available for particle filtering and accumulation. To remove accumulated carbon dioxide particles from the accumulation chamber 34, the transfer piston 52 is moved into and through the accumulation chamber 34 to push any accumulated carbon dioxide particles through the exit opening 38 and the exit portal 18. The transfer piston 52 may then be returned to its recessed position. The transfer piston 52 includes a sealing ring 53 disposed on its circumference and in slidable contact with the cylinder wall to provide a seal between the transfer piston 52 and the filter body 32. The sealing ring 53 may be formed from Viton, Buna-N or other material capable of maintaining suitable sealing characteristics in a low temperature environment.

The particle removal assembly 50 includes a transfer piston actuation assembly 54 that includes a transfer piston rod 56 connected to a pressurized fluid actuation system illustrated schematically at 58. The pressurized fluid actuation system 58 may include a pneumatic actuator connected to a pressurized gas source or a hydraulic actuator connected to a pressurized hydraulic fluid source. It will be apparent to those skilled in the art that many such actuation systems are available and that a wide variety would provide suitable control of the reciprocating movement of the transfer piston 52.

The accumulator assembly 11 of the present invention is operated by sealing the exit portal 18 and injecting liquid carbon dioxide into the accumulation chamber 34 through the filter injector port 36 using the injection probe 42. The pressure drop experienced by the carbon dioxide causes it to change phase from liquid to a mixture of gas and small solid particles. The exit portal 18 is sealed because the solid particles tend to flow with the gas. If the exit portal 18 is not sealed, some of the solid particles could accumulate within the accumulation chamber 34, but most would likely flow out through the exit portal 18 with the gas and be lost. Little, if any, gas would pass through the filter body 32.

According to the present invention, the gas path through the exit portal 18 is sealed by the cooperative action of a compression piston disposed in a compression chamber as is described in greater detail hereafter. With the exit portal 18 sealed to prevent gas flow, the only path remaining for the gas is through the filter media of filter body 32 and out through the vapor exhaust port 20. Passage of the solid carbon dioxide particles through the filter body 32 is inhibited through the use of perforations smaller than the diameter of the particles or, ideally, a porous material structure. The preferred porous stainless steel filter body with a porosity of 100 microns is highly effective at preventing carbon dioxide particle passage yet provides sufficient flow area to allow the carbon dioxide gas to pass through unimpeded, thereby preventing a buildup of pressure within the accumulation chamber 34. The solid carbon dioxide particles are thus trapped within the accumulation chamber 34 while the gas is emitted through the filter body 32.

After a predetermined time, the injection of liquid carbon dioxide into the accumulation chamber 34 is stopped so that the accumulated carbon dioxide particles may be removed.

This is accomplished by uncovering the exit portal 18 and moving the transfer piston 52 the full length of the accumulation chamber 34 to push the particles through the exit opening 38 and the exit portal 18. The transfer piston 52 may then be withdrawn, the exit portal 18 covered, and liquid carbon dioxide injection reinitiated.

An accumulator according to the preferred embodiment provides approximately 1.5 lbs. of solid carbon dioxide for every 3.5 pounds of liquid carbon dioxide injected. Thus, approximately 2 lbs. of gas is exhausted for every 3.5 lbs. of liquid injected. The vapor exhaust port 20 may be connected to a carbon dioxide gas recovery system (not shown) to permit the carbon dioxide gas to be received and processed back into liquid carbon dioxide. This provides a highly efficient system that reduces loss of carbon dioxide.

Compression assembly 70 includes a compression housing 72 that defines a compression chamber 82 and two transfer portals 80, 81. The compression housing 72 includes a compression housing barrel 74, a forward retainer plate 76 and a rear retainer plate 78. The compression housing 72 and the compression chamber 82 may be cylindrical or prismatic with a rectangular or square cross-section. It should be understood that the compression housing 72 and the compression chamber 82 may be other shapes and the compression housing 72 may be formed as a single integral unit without departing from the spirit and scope of the present invention.

The compression housing barrel 74 includes two transfer portals 80, 81 that provide access to the compression chamber 82. The number and configuration of the transfer portals 80, 81 are designed to correspond with the number and configuration of accumulator assemblies. A spacer 88 defining two spacer ports 89 is attached to the compression housing barrel 74 to provide an interface with the accumulator assemblies 11, 111. The spacer ports 89 are positioned so that they are aligned with the transfer portals 80, 81.

At one end of the compression chamber 82, the compression housing 74 defines a piston entrance 86 through which a solid piston 90 may be introduced into the compression chamber 82. The compression piston 90 is configured to be slidably moveable within the compression chamber 82. The inner surface 83 of the compression housing barrel 74 is preferably substantially smooth to facilitate the substantially complete removal of carbon dioxide particles from the compression chamber 82.

Figure 3:
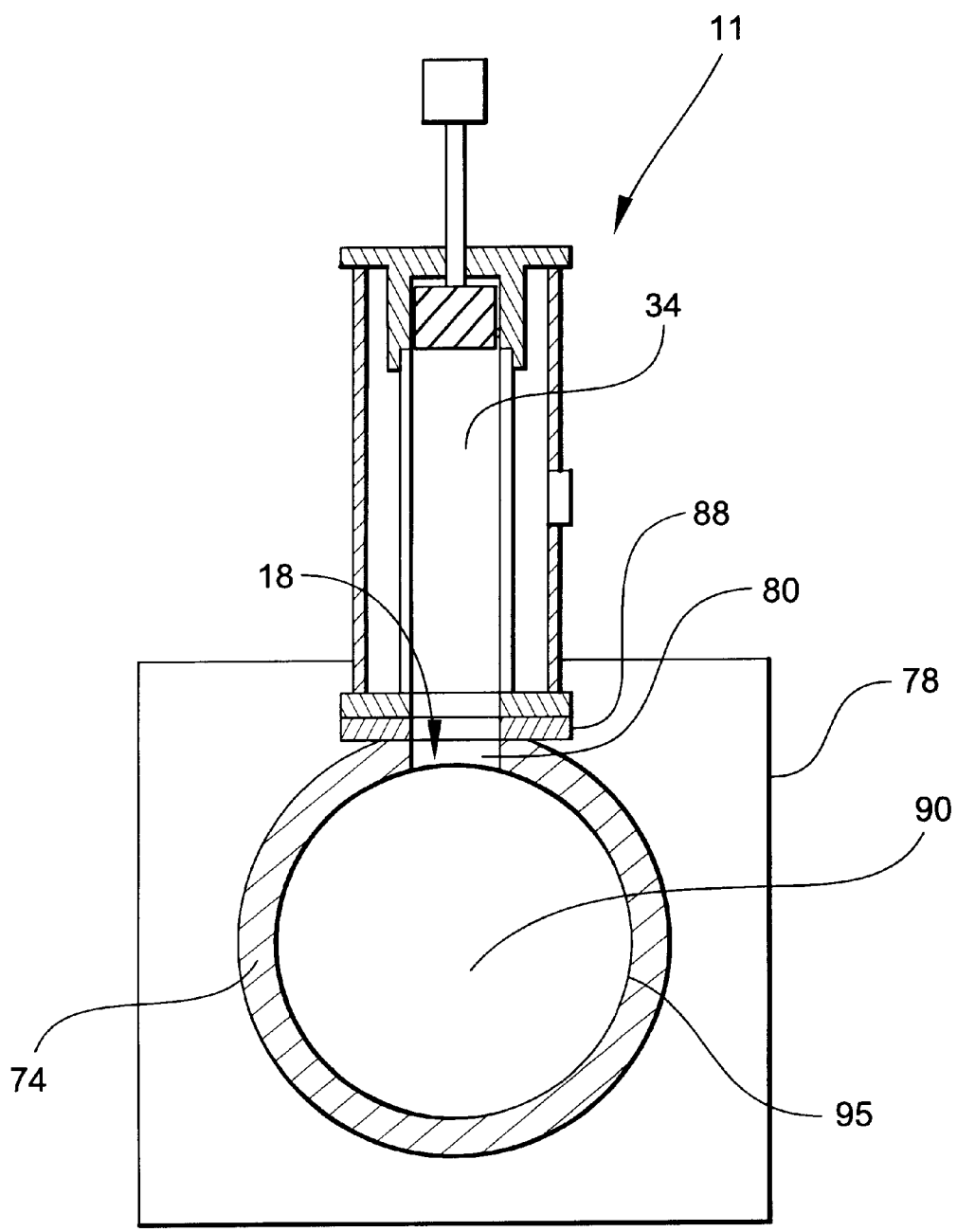
FIG. 3 is an end cross-sectional, diagrammatic view of the liquid carbon dioxide conversion apparatus illustrated in FIG. 1.

As shown in FIGS. 1 and 3, a sealing sleeve 95 is disposed on at least a portion of the circumference of the compression piston 90 to provide a seal between the compression piston 90 and the inner surface 83 of the compression housing barrel 74 and to seal the transfer portals, 80, 81 as will be described in more detail hereafter. The sealing sleeve is preferably formed from ultra high molecular weight plastic, but it will be understood that other materials suitable for low temperature environments may be used. The compression piston 90 and the sealing sleeve 95 are configured to provide a covering seal for both transfer portals 80, 81 concurrently. As will be discussed in more detail hereafter, the length of the compression piston 90 and the sealing sleeve 95 may be further lengthened depending on the desired extrusion cycle.

Movement of the compression piston 90 within the compression chamber 82 is effected and controlled using a compression piston actuation assembly 92. The compression piston actuation assembly 92 includes a compression piston rod 94 connected to compression piston 90 and to a pressurized fluid actuation assembly, illustrated schematically at 96. The pressurized fluid actuation assembly 96 preferably includes a hydraulic actuator system. Those skilled in the art will recognize that other actuation systems may be used including those using a pneumatic actuator.

The liquid carbon dioxide conversion apparatus 10 includes an extruder plate 98 removably attached to forward retainer plate 76 adjacent the forward end 84 of compression chamber 82. The extruder plate 98 includes a number of tapered extrusion holes 100 through which particulate carbon dioxide may be forced to produce solid carbon dioxide pellets. The size and number of the extrusion holes 100 may be determined from the desired pellet dimensions.

The compression assembly 70 of liquid carbon dioxide conversion apparatus 10 is operated by introducing a quantity of particulate solid carbon dioxide into the compression chamber 82 through the transfer portals 80, 81 and compressing the particulate solid carbon dioxide against and through the extruder plate 98 using the piston 90.

The conversion apparatus 10 is distinguished from present industry extrusion machinery by the manner in which the compression assembly 70 cooperates with the accumulator assemblies 11, 111. The accumulator assemblies 11, 111 require that the accumulator chambers 34, 134 be sealed during conversion of liquid carbon dioxide to particulate solid carbon dioxide. In the present invention, the seal is provided by the compression piston 90 and sealing sleeve 95. This is accomplished by attaching the accumulator assemblies 11, 111 to the compression assembly 70 at the spacer 88 so that the exit portals 18, 118 and the central axes of the cylindrical snow accumulation chambers 34, 134 of the accumulator assemblies 11, 111 are substantially aligned with corresponding spacer ports 89 and transfer portals 80, 81. When the compression piston 90 is positioned so that the exit portals 80, 81 are open, the snow accumulation chambers 34, 134 are in communication with the compression chamber 82. When the compression piston 90 is in the position illustrated in FIG. 1, transfer portal 80 is sealed and transfer portal 81 is open. The sealing of transfer portal 80 effectively seals the snow accumulation chamber 34 so that the only path for carbon dioxide gas formed within the snow accumulation chamber 34 is through the wall of the filter body 32. This allows operation of the accumulator assembly 11 in the manner previously described to substantially fill the snow accumulation chamber with solid particulate carbon dioxide. The compression piston 90 is then repositioned to unseal the transfer portal 80 to permit transfer of the solid particulate carbon dioxide from the snow accumulation chamber 34 to the compression chamber 82.

According to the method of the present invention, a conversion apparatus 10 as described above is used to produce solid carbon dioxide pellets. According to the method, the compression piston 90 is first positioned within the compression housing 83 so that transfer portals 80, 81 are sealed by the sealing ring 53. Liquid carbon dioxide is injected into the snow accumulation chambers 34, 134 through the filter injector port 36 of each accumulator assembly using the injection probe 42. When injected, the liquid carbon dioxide changes phase to gaseous and solid particulate carbon dioxide. The gaseous carbon dioxide passes through the wall of the filter bodies 32 and is exhausted through the vapor exhaust ports 20 for collection or reconversion to liquid carbon dioxide. Particulate solid carbon dioxide is filtered from the gaseous carbon dioxide by the filter body 32 and is accumulated within the accumulation chambers 34, 134. The transfer portals 80, 81 remain sealed for a sufficient length of time for the accumulator assemblies 11, 111 to substantially fill the snow accumulation chambers 34, 134 with solid particulate carbon dioxide. Once this is accomplished, the compression piston 90 is withdrawn toward the piston entrance 86, thereby opening the transfer portals 80, 81. The accumulated solid particulate carbon dioxide is then pushed from the snow accumulation chambers 34, 134 through the exit portals 18, 118, the spacer ports 89 and the transfer portals 80, 81 into the compression chamber 82 using the accumulator pistons 52, 152. The compression piston 90 is then moved toward the extrusion plate 98, thereby pushing the particulate solid carbon dioxide against the extruder plate 98 and through the extrusion holes 100. The taper of the extrusion holes 100 causes the particulate solid carbon dioxide to be compressed into rods of solid carbon dioxide. As they are extruded these rods break into varying lengths to form solid carbon dioxide pellets.

When the compression piston 90 is moved toward the extrusion plate 98, the transfer portals 80, 81 are resealed by the compression piston 90 and the sealing ring 53. As the compression piston 90 continues to push solid carbon dioxide particles toward and through the extruder plate 98, liquid carbon dioxide is again injected into the snow accumulation chambers 34, 134 to produce additional particulate solid carbon dioxide. The compression piston 90 and the sealing sleeve 95 are configured so that the exit portals 80, 81 may remain sealed while the compression piston 90 completes its travel to the extruder plate 98. The compression piston 90 is then withdrawn toward the piston entrance 86, unsealing the transfer portals 80, 81 so that the additional solid particulate carbon dioxide may be transferred to the compression chamber. It is preferred that the configuration and location of the transfer portals 80, 81 and the timing sequence of compression piston movements and accumulator cycling are integrated so that the transfer portals 80, 81 remain sealed for a sufficient length of time for the accumulator assemblies 11, 111 to refill snow accumulation chambers 34, 134 without stopping the reciprocating motion of the compression piston 90. This minimizes the overall cycling time of the conversion apparatus 10. It will be understood by those skilled in the art, however, that the movements of compression piston 90 may be varied without departing from the scope and spirit of the invention. For example, if larger accumulator assemblies are used so that the accumulation cycle is of longer duration than the extrusion cycle of the compression piston 90, the movement of the compression piston 90 may be paused when the compression piston 90 is in position to seal the transfer portals 80, 81 to provide sufficient time for the accumulation chambers to fill.

Figure 4:
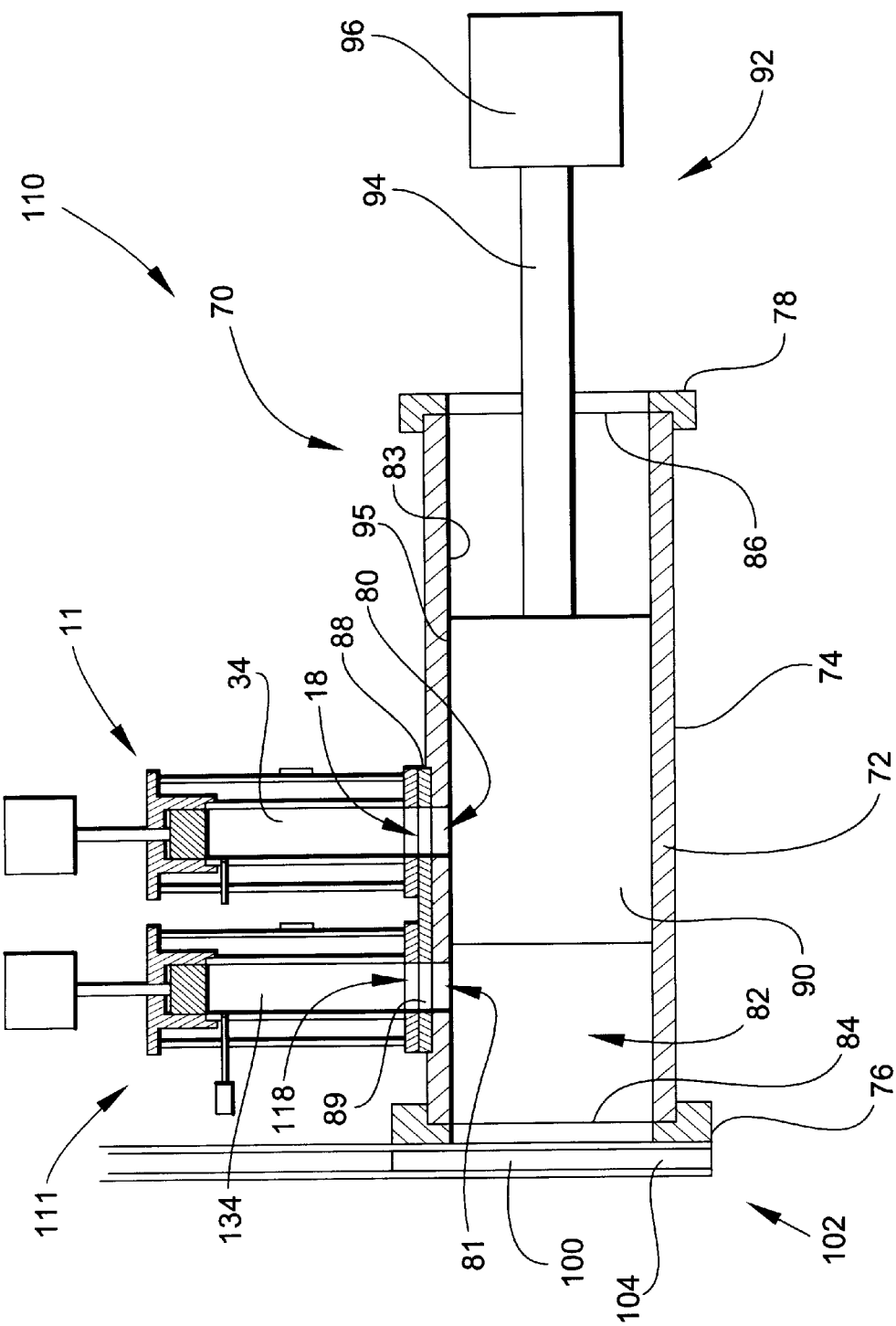
FIG. 4 is a side cross-sectional, diagrammatic view of a liquid carbon dioxide conversion apparatus according to another preferred embodiment of the present invention.

In another embodiment illustrated generally in FIG. 4 at 110, the extruder plate 98 is replaced with a compression wall assembly 102. The compression wall assembly 102 includes a compression wall 104 that selectively blocks the forward end 84 of the compression chamber 82. The conversion apparatus 110 according to this embodiment is used to compress particulate solid carbon dioxide into solid blocks. This is accomplished by depositing particulate carbon dioxide into the compression chamber 82 and compressing it against the compression wall 104 using the compression piston 90, thereby forming a solid block. The compression wall 104 is then moved out of covering relation with the forward end 84 of compression chamber 82, whereupon the solid block of carbon dioxide may be pushed out of compression chamber 82 by compression piston 90. The compression wall assembly 102 is preferably configured as a slide gate. However, it will be understood by those skilled in the art that other mechanisms for attaching and controlling the movement of the compression wall 104 may be used.

According to another embodiment of the method of the present invention, a conversion apparatus 10 as described above includes a compression wall assembly 102 and is used to produce a solid carbon dioxide block. According to the method, the compression piston 90 is first positioned within the compression housing 83 so that transfer portals 80, 81 are sealed by the sealing ring 53. Liquid carbon dioxide is injected into the snow accumulation chambers 34, 134 through the filter injector port 36 of each accumulator assembly using the injection probe 42. When injected, the liquid carbon dioxide changes phase to gaseous and solid particulate carbon dioxide. The gaseous carbon dioxide passes through the wall of the filter bodies 32 and is exhausted through the vapor exhaust ports 20 for collection or reconversion to liquid carbon dioxide. Particulate solid carbon dioxide is filtered from the gaseous carbon dioxide by the filter body 32 and is accumulated within the accumulation chambers 34, 134.

The transfer portals 80, 81 remain sealed for a sufficient length of time for the accumulator assemblies 11, 111 to substantially fill the snow accumulation chambers 34, 134 with solid particulate carbon dioxide. Once this is accomplished, the compression piston 90 is withdrawn toward the piston entrance 86, thereby opening the transfer portals 80, 81. The accumulated solid particulate carbon dioxide is then pushed from the snow accumulation chambers 34, 134 through the exit portals 18, 118, the spacer ports 89 and the transfer portals 80, 81 into the compression chamber 82 using the accumulator pistons 52, 152. With the compression wall 104 in its covering position, the compression piston 90 is then moved toward the compression wall 104, thereby pushing the particulate solid carbon dioxide against the compression wall 104. The compression piston 90 thus compresses the particulate solid carbon dioxide into a solid carbon dioxide block against the compression wall 104. The compression wall 104 is then moved to its uncovering position and the compression piston 90 pushes the solid carbon dioxide block out of the compression chamber 82.

As the compression piston 90 is moved toward the compression wall 104, the transfer portals 80, 81 are resealed by the compression piston 90 and the sealing ring 53. As compression piston 90 continues to move in this direction, liquid carbon dioxide is again injected into the snow accumulation chambers 34, 134 to produce additional particulate solid carbon dioxide. The compression piston 90 and the sealing sleeve 95 are configured so that the exit portals 80, 81 may remain sealed while the compression piston 90 completes its travel to the compression wall 104. The compression piston 90 is then withdrawn toward the piston entrance 86 and the compression wall 104 is moved back into its covering position. As the compression piston 90 is withdrawn, the transfer portals 80, 81 are unsealed so that the additional solid particulate carbon dioxide may be transferred to the compression chamber.

Preferably, the configuration and location of the transfer portals 80, 81 and the timing sequence of compression piston movements and accumulator cycling are integrated so that the transfer portals 80, 81 remain sealed for a sufficient length of time for the accumulator assemblies 11, 111 to refill snow accumulation chambers 34, 134 without stopping the reciprocating motion of the compression piston 90.

As noted above, the compression housing 72 and compression chamber 82 may be either generally cylindrical or generally prismatic. Typically, in the embodiment 10 used for extrusion, the compression housing 72 and the compression chamber 82 are generally cylindrical as shown in FIG.

3, and in the embodiment 110 used for producing blocks of solid carbon dioxide, the compression housing 72 and compression chamber 82 are generally prismatic with a rectangular cross-section (not shown).

The accumulator assemblies used in the present invention are designed to be interchangeable. In addition, the assemblies are easily removable for maintenance or replacement.

The carbon dioxide conversion apparatus of the present invention provides significant cycling time advantages over present technology. Current extrusion machinery often uses a single chamber for formation of particulate solid carbon dioxide and compression/extrusion. This approach has several disadvantages that are not found in the present invention. First, the single chamber must be a sealable pressure vessel during the formation process in order for the portion of the liquid carbon dioxide that is converted to gaseous carbon dioxide to be recovered. Second, the gaseous carbon dioxide formed in this manner can be vented only after completion of formation of solid particulate carbon dioxide. Third, and most importantly, the extrusion of solid particulate carbon dioxide cannot begin until completion of the formation and venting processes.

By contrast, in the present invention, extrusion and particulate carbon dioxide formation may take place simultaneously, thus shortening the overall cycling time. In addition, gaseous carbon dioxide is vented continuously during the particulate carbon dioxide formation process. Because the formation process takes place in a separate chamber, the compression chamber need not be sealed to prevent the escape of gaseous carbon dioxide. The result is that an entire cycle of formation and extrusion may be accomplished in as little as ten to twelve seconds. This cycle time is approximately one-fifth that of current industry machinery. The present invention is thus capable of increasing production rate by a factor of five over current technology. The dimensions of the compression and accumulator assemblies may be sized according to need. Also, the number of accumulators may be varied, making the invention highly flexible.

The present invention provides an apparatus for rapid, highly efficient conversion of liquid carbon dioxide to solid carbon dioxide pellets or blocks. The apparatus uses relatively low complexity components and is easily adaptable for cooperative use with other dry ice processing machines. In addition, because it operates as a closed system with substantially all carbon dioxide gas captured and recycled, the apparatus also provides a safe working environment.

It will be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A liquid carbon dioxide conversion apparatus for converting liquid carbon dioxide to compressed solid carbon dioxide, said apparatus comprising:

a compression housing defining a compression chamber having opposed forward and rearward ends and at least one transfer portal in fluid communication with said compression chamber;

means for converting liquid carbon dioxide to particulate solid carbon dioxide, including at least one snow accumulation chamber in fluid communication with said at least one transfer portal;

means for transferring particulate solid carbon dioxide from each said snow accumulation chamber to said compression chamber through said at least one transfer portal; and a compression piston movably mounted in said compression chamber and configured for compressing particulate solid carbon dioxide accumulated within said compression chamber, wherein said compression piston is reciprocally movable between a first position adjacent said rear end and a second position adjacent said forward end, said at least one transfer portal being at least partially open when said compression piston is located within a first range extending between said first position and a third position and said at least one transfer portal is sealed by said compression piston when said compression piston is located within a second range extending from said third position to said second position, said third position being intermediate said first and second positions;

wherein said means for converting liquid carbon dioxide is operable only while said at least one transfer portal is sealed by said compression piston and said means for converting liquid carbon dioxide is operable while said compression piston is in motion.

2. A liquid carbon dioxide conversion apparatus according to claim 1 wherein said compression chamber has first and second open ends, said first open end being configured for receiving said compression piston into said compression chamber, said apparatus further comprising:

an extruder plate removably attached to said compression housing in covering relation to said second end of said compression chamber, said extruder plate having at least one extrusion hole extending therethrough in communication with said compression chamber, whereby particulate solid carbon dioxide pressed against said extruder plate by said compression piston will be forced through said extrusion holes to form extruded solid carbon dioxide pellets.

3. A liquid carbon dioxide conversion apparatus according to claim 2 wherein said compression chamber is formed with a generally cylindrical configuration.

4. A liquid carbon dioxide conversion apparatus according to claim 1 wherein said forward and rearward ends of said compression chamber are open, said forward end being configured for receipt of said compression piston into said compression chamber, said apparatus further comprising:

a movable compression wall attached to said compression housing and selectively movable in and out of covering relation with said forward end of said compression chamber and against which particulate solid carbon dioxide may be compressed by said compression piston when said compression wall is in covering relation with said forward end of said compression chamber.

5. A liquid carbon dioxide conversion apparatus according to claim 1 wherein said means for transferring particulate solid carbon dioxide includes a transfer piston movably mounted within each said snow accumulation chamber, whereby particulate solid carbon dioxide within said snow accumulation chamber may be pushed by said transfer piston from said snow accumulation chamber into said compression chamber.

6. A liquid carbon dioxide conversion apparatus according to claim 5 and further comprising means for selectively actuating movement of said transfer piston within said snow accumulation chamber.

7. A liquid carbon dioxide conversion apparatus according to claim 6, wherein said means for selectively actuating movement of said transfer piston includes a transfer piston rod connected to a pressurized fluid actuation system for selective application of pressurized fluid to said transfer piston rod to cause transfer piston movement.

8. A liquid carbon dioxide conversion apparatus according to claim 1 wherein said means for converting liquid carbon dioxide to particulate solid carbon dioxide further includes:
   at least one accumulator housing defining an injection chamber, a chamber injector port in fluid communication with said injection chamber and an exit portal in fluid communication with said at least one transfer portal, and having a vapor exhaust port formed therein, said vapor exhaust port being in fluid communication with said injection chamber;
   a filter mounted to said accumulator housing within said injection chamber, said filter including a filter body defining said snow accumulation chamber, a filter injector port and an exit opening, said filter body being mounted to said accumulator housing with said exit opening adjacent said exit portal, whereby at least a portion of liquid carbon dioxide injected through said chamber injector port and said filter injector port into said snow accumulation chamber undergoes phase transition to gaseous carbon dioxide for emission through said filter body and exhaustion through said exhaust port and whereby at least a second portion of the liquid carbon dioxide undergoes phase transition to particulate solid carbon dioxide for accumulation within said snow accumulation chamber when said at least one transfer portal is sealed by said compression piston.

9. A liquid carbon dioxide conversion apparatus according to claim 8 further comprising:
   means for injecting liquid carbon dioxide through said chamber injector port and said filter injector port into said snow accumulation chamber when said at least one transfer portal is sealed by said compression piston for phase transition of at least a portion of the liquid carbon dioxide to gaseous carbon dioxide for emission through said filter body and said exhaust port, and for phase transition of at least a portion of the liquid carbon dioxide to particulate solid carbon dioxide for accumulation within said snow accumulation chamber.

10. A liquid carbon dioxide conversion apparatus according to claim 1 further comprising means for selectively actuating movement of said compression piston within said compression chamber.

11. A liquid carbon dioxide conversion apparatus according to claim 10, wherein said means for selectively actuating movement of said compression piston includes a compression piston rod connected to a pressurized fluid actuation system for selective application of pressurized fluid to said compression piston rod to cause compression piston movement.

12. A liquid carbon dioxide conversion apparatus according to claim 1 further comprising a sealing sleeve disposed over at least a portion of the circumference of said compression piston, said sealing sleeve being in slidable contact with the inner surface of said compression chamber.

13. A method for converting liquid carbon dioxide to compressed solid carbon dioxide pellets, said method comprising the following steps:
   providing a compression housing defining a compression chamber and a transfer portal, said compression chamber having a compression piston disposed therein, said compression chamber having opposing first and second open ends, said first open end being configured for receiving said compression piston, said compression piston being reciprocally movable between a first position adjacent said first open end and a second position adjacent said second open end, wherein said transfer portal is at least partially open when said compression piston is located within a first range extending between said first position and a third position and said transfer portal is sealed by said compression piston when said compression piston is located within a second range extending from said third position to said second position, said third position being intermediate said first and second positions;
   providing an extruder plate removably attached to said compression housing in covering relation with said second end of said compression chamber, said extruder plate having at least one extrusion hole extending therethrough in communication with said compression chamber;
   providing means for converting liquid carbon dioxide to particulate solid carbon dioxide, including a snow accumulation chamber in fluid communication with said transfer portal said means for converting liquid carbon dioxide being operable only when said transfer portal is sealed by said compression piston;
   moving said compression piston from said first position through said third position to said second position in a continuous manner, thereby sealing said transfer portal and forcing solid carbon dioxide particles accumulated within said compression chamber toward said second open end of said compression chamber, thereby forcing the solid carbon dioxide particles against said extruder plate and through said at least one extrusion hole;
   initiating conversion of liquid carbon dioxide to particulate solid carbon dioxide for accumulation within said snow accumulation chamber using said means for converting liquid carbon dioxide while said compression piston is moving and while said compression piston is in said second range;
   moving said piston toward said first end of said compression chamber
   terminating conversion of liquid carbon dioxide by said means for converting liquid carbon dioxide; and
   transferring the particulate solid carbon dioxide from said snow accumulation chamber to said compression chamber.

14. A method according to claim 13 wherein said step of providing means for converting liquid carbon dioxide to solid particulate carbon dioxide includes providing an accumulator housing defining an injection chamber and a filter mounted to said accumulator housing within said injection chamber, said filter including a filter body defining said accumulation chamber.

15. A method for converting liquid carbon dioxide to a compressed solid carbon dioxide block, said method comprising the following steps:

providing a compression housing defining a compression chamber and a transfer portal, said compression chamber having a compression piston disposed therein, said compression chamber having opposing first and second open ends, said first open end being configured for receiving said compression piston, said compression piston being reciprocally movable between a first position adjacent said first open end and a second position adjacent said second open end, wherein said transfer portal is at least partially open when said compression piston is located within a first range extending between said first position and a third position and said transfer portal is sealed by said compression piston when said compression piston is located within a second range extending from said third position to said second position, said third position being intermediate said first and second positions;

providing a movable compression wall attached to said compression housing and selectively movable in and out of a covering relation with said second open end of said compression chamber;

providing means for converting liquid carbon dioxide to particulate solid carbon dioxide, said means for converting including a snow accumulation chamber in fluid communication with said transfer portal said means for converting liquid carbon dioxide being operable only when said transfer portal is sealed by said compression piston;

moving said compression piston from said first position through said third position to said second position in a continuous manner, thereby sealing said transfer portal and forcing solid carbon dioxide particles accumulated within said compression chamber toward said second open end of said compression chamber, thereby pressing the solid carbon dioxide particles against said compression wall, thereby compressing the solid carbon dioxide particles into a block of solid carbon dioxide;

initiating conversion of liquid carbon dioxide to particulate solid carbon dioxide for accumulation within said snow accumulation chamber using said means for converting liquid carbon dioxide while said compression piston is moving and while said compression piston is in said second range;

moving said piston toward said first end of said compression chamber;

terminating conversion of liquid carbon dioxide by said means for converting liquid carbon dioxide;

transferring the particulate solid carbon dioxide from said snow accumulation chamber to said compression chamber;

moving said compression wall out of covering relation with said second open end of said compression chamber; and pushing the block of solid carbon dioxide out of said compression chamber.

16. A method according to claim 15 wherein said step of providing means for converting liquid carbon dioxide to solid particulate carbon dioxide includes providing an accumulator housing defining an injection chamber and a filter mounted to said accumulator housing within said injection chamber, said filter including a filter body defining said accumulation chamber.

17. A liquid carbon dioxide conversion apparatus according to claim 1 wherein said compression housing defines a plurality of transfer portals in fluid communication with said compression chamber and said means for converting liquid carbon dioxide to particulate solid carbon dioxide includes a plurality of snow accumulation chambers, each of said plurality of snow accumulation chambers being in fluid communication with an associated one of said plurality of transfer portals.

18. A liquid carbon dioxide conversion apparatus according to claim 17 wherein said compression piston and said compression housing are configured so that when said compression piston is in said first position all of said transfer portals are open and when said compression piston is in said second position, all of said transfer portals are sealed.

19. A liquid carbon dioxide conversion apparatus according to claim 18 wherein said compression piston and said compression housing are further configured so that said compression piston sequentially seals said transfer portals as said compression piston is moved from said first position to said second position.

20. A liquid carbon dioxide conversion apparatus for converting liquid carbon dioxide to compressed solid carbon dioxide, said apparatus comprising:

a compression housing defining a compression chamber and a plurality of transfer portals in fluid communication with said compression chamber;

means for converting liquid carbon dioxide to particulate solid carbon dioxide, including a plurality of snow accumulation chambers, each of said plurality of snow accumulation chambers being in fluid communication with an associated one of said plurality of transfer portals; and a compression piston movably mounted in said compression chamber and configured for compressing particulate solid carbon dioxide accumulated within said compression chamber and for selectively sealing and unsealing said plurality of transfer portals.

21. A liquid carbon dioxide conversion apparatus according to claim 20 wherein said compression piston is reciprocally movable between a first position and a second position and said compression piston and said compression housing are configured so that when said compression piston is in said first position all of said transfer portals are open and when said compression piston is in said second position, all of said transfer portals are sealed.

22. A liquid carbon dioxide conversion apparatus according to claim 21 wherein said compression piston and said compression housing are further configured so that said compression piston sequentially seals said transfer portals as said compression piston is moved from said first position to said second position.

23. A method for converting liquid carbon dioxide to compressed solid carbon dioxide, said method comprising:

providing a compression housing defining a compression chamber and a transfer portal, said compression chamber having a compression piston disposed therein and having opposing forward and rear ends, said rear end being configured for receiving said compression piston, said compression piston being reciprocally movable between a first position adjacent said rear end and a second position adjacent said forward end, wherein said transfer portal is at least partially open when said compression piston is located within a first range extending between said first position and a third position and said transfer portal is sealed by said compression piston when said compression piston is located within a second range extending from said third position to said second position, said third position being intermediate said first and second positions;

providing means for converting liquid carbon dioxide to particulate solid carbon dioxide, said means for converting including a snow accumulation chamber in fluid communication with said transfer portal and said means for converting being operable only when said transfer portal is sealed by said compression piston;

moving said compression piston from said first position through said third position to said second position in a continuous manner, thereby sealing said transfer portal and forcing solid carbon dioxide particles accumulated within said compression chamber toward said forward end of said compression chamber; and initiating conversion of liquid carbon dioxide to particulate solid carbon dioxide for accumulation within said snow accumulation chamber using said means for converting liquid carbon dioxide while said compression piston is moving and while said compression piston is in said second range.

24. A method for converting liquid carbon dioxide to compressed solid carbon dioxide, according to claim 23 further comprising:

moving said compression piston from said second position to said first position;

terminating conversion of liquid carbon dioxide by said means for converting liquid carbon dioxide; and transferring particulate solid carbon dioxide from said snow accumulation chamber to said compression chamber.

25. A method for converting liquid carbon dioxide to compressed solid carbon dioxide, said method comprising:

providing a compression housing defining a compression chamber and a plurality of transfer portals, said compression chamber having a compression piston disposed therein and having opposing forward and rear ends, said rear end being configured for receiving said compression piston, said compression piston being reciprocally movable between a first position adjacent said rear end and a second position adjacent said forward end, wherein said transfer portals are sealed by said compression piston when said compression piston is located within a second range extending from said third position to said second position, said third position being intermediate said first and second positions;

providing a plurality of solid carbon dioxide accumulator units, each accumulator unit including a snow accumulation chamber in fluid communication with an associated one of said transfer portals and being operable to convert liquid carbon dioxide to solid carbon dioxide particles only when said associated one of said transfer portals is sealed by said compression piston;

moving said compression piston from said first position through said third position to said second position in a continuous manner, thereby sealing said plurality of transfer portals and forcing solid carbon dioxide particles accumulated within said compression chamber toward said forward end of said compression chamber;

initiating conversion of liquid carbon dioxide to particulate solid carbon dioxide for accumulation within each said snow accumulation chamber using said solid carbon dioxide accumulator units;

moving said compression piston from said second position to said first position; terminating conversion of liquid carbon dioxide by said solid carbon dioxide accumulator units; and transferring particulate solid carbon dioxide from each said snow accumulation chamber to said compression chamber.

26. A method for converting liquid carbon dioxide to compressed solid carbon dioxide according to claim 24 wherein the step of moving said compression piston from said first position through said third position causes the plurality of transfer portals to be sealed sequentially and wherein the step of initiating conversion of liquid carbon dioxide to particulate solid carbon dioxide is conducted separately by each of said accumulator units responsive to the sealing of each associated transfer portal.

* * * * *